Patented Aug. 14, 1934

1,970,270

UNITED STATES PATENT OFFICE 1,970,270

PROCESS OF DISSOLVING CELLULOSE

Nicholas U. Berchin, Cleveland, Ohio, assignor to Thurlow G. Gregory, East Cleveland, Ohio No Drawing. Application March 14, 1931, Serial No. 522,791

6 Claims. (Cl. 260—100)

This invention relates to an improved process of dissolving cellulose in sulphuric acid or other solvent of similar nature, the primary object being to provide a comparatively simple method by which the desired result can be economically and expeditiously accomplished without appreciable injury to the cellulose. It is well known that direct application of such acid as sulphuric to cellulose causes the latter to be burned and discolored or hydrolyzed to sugar and its commercial value destroyed. My invention obviates this difficulty by providing a phase in the process which protects, to a practical degree, the cellulose from deterioration.

Basically, my invention resides in including in the process of dissolving cellulose in a relatively strong solvent which, when combining with the cellulose, would ordinarily produce undesirable heat, the step or phase of maintaining the mixture relatively cool by evaporation, such being effected by the use of a volatile ingredient, as will hereinafter more fully appear.

My improved process consists, generally, in preparing the cellulose for dissolution in the sulphuric acid or other solvent and mixing with the cellulose an aqueous solution or mixture containing an element or portion emissible through evaporation or gasification by strong sulphric acid or like solvent and thereafter adding the solvent to the total mixture preferably while the whole is kept in a state of agitation as by stirring.

The addition of the sulphuric acid or like solvent to the total mixture tends to raise the temperature of the mass, results in driving off an emissible content from said solution or mixture and leaves an aqueous residue thereof for mixture with the solvent.

The emission of the emittible content of the aforesaid mixture or solution has the effect of maintaining the mass relatively cool and thereby preventing the sulphuric acid or solvent from unduly burning the cellulose. In the conclusion of the process the diluted sulphuric acid or other solvent comes into direct contact with the cellulose and dissolves it at a comparatively low temperature, and the resultant product is a viscous mixture of about the consistency of heavy molasses.

In the practice of the invention, it is my present preference to use hydrochloric (or muriatic) acid as the ingredient which I term an aqueous gasifiable substance. However other volatile agents may be employed, as, for example, oxalic acid or formic acid. Broadly, the ingredient in question may be considered a refrigerant with a suitable absorbent therefor. The cellulose, with a suitable quantity of the hydrochloric acid, is placed in a vessel or tank and is agitated or stirred by suitable means. The solvent, preferably sulphuric acid, is then added while the agitation is continued. The ingredients may be used in approximately the following proportions: cellulose 1 lb.; hydrochloric acid, 3 to 6 lbs., and sulphuric acid, 4 to 8 lbs. The hydrochloric acid is preferably about a 30% to 35% solution, and the sulphuric acid approximately a 95% solution.

During the evaporation of the hydrochloric acid, the vapors are desirably carried off and reabsorbed in water until about a 30% to 35% solution is obtained, which may be reemployed in the process. Thus it will be seen that there is practically no loss of the hydrochloric acid, the purpose of which, as is evident from the above, is to maintain, by its evaporation, the temperature of the mass sufficiently low to prevent appreciable deterioration of the cellulose by the solvent or sulphuric acid.

Dissolved in the manner above described, the cellulose is made ready for use in processes of manufacture of various commercial products, as, for example, artificial or so-called "rayon" silk, cellophane or film, artificial hair, etc.

It may be explained that in the manufacture of such products, the dissolved cellulose is mechanically acted upon to compress it or to extrude it into its final shape or to impart to it its desired physical character, and after it is so acted upon it is subjected to a solution that will partially or wholly neutralize or wash out the solvent or sulphuric acid, as otherwise the continued presence of such solvent or acid might be objectionable. This end may be attained by subjecting the compound of cellulose and solvent or sulphuric acid to a bath containing, for example, an alkali carbonate or alkali, caustic with or without various suitable salts. These chemicals act on the sulphuric acid or other solvent as neutralizing agents. For the purpose of removing the sulphuric acid, water may also be employed. The effect of this last step is to purify the coagulated or regenerated compound of cellulose.

Having thus described my invention, what I claim is:

1. The process which includes mixing cellulose with an aqueous solution of hydrochloric acid and then adding strong sulphuric acid in sufficient quantity to dissolve the cellulose.

2. The process which includes mixing cellulose with water and a refrigerant of the group consisting of oxalic, formic and hydrochloric acids and thereafter adding strong sulphuric acid in sufficient quantity to dissolve the said cellulose.

3. The process which includes adding to a quantity of cellulose an amount of an aqueous mixture of a refrigerant of the group consisting of oxalic acid, formic acid and hydrochloric acid and then adding enough strong sulphuric acid to produce a syrupy liquid.

4. The process which includes mixing cellulose with an aqueous solution of hydrochloric acid and thereafter adding concentrated sulphuric acid, the amount of hydrochloric acid employed being from three to six times by weight of the cellulose and the sulphuric acid being added in amount sufficient to produce a syrupy liquid.

5. The process of dissolving cellulose into a syrup with concentrated sulphuric acid which includes mixing with the cellulose dilute hydrochloric acid and thereafter adding the concentrated sulphuric acid, the aforesaid ingredients being in substantially the following proportions: cellulose 1 pound, dilute hydrochloric acid 3 to 6 pounds and concentrated sulphuric acid 4 to 8 pounds.

6. The process which includes mixing cellulose with an aqueous solution of hydrochloric acid and then adding strong sulphuric acid in sufficient quantity to produce a syrupy liquid.

NICHOLAS U. BERCHIN.